United States Patent [19]

King et al.

[11] Patent Number: 4,869,759

[45] Date of Patent: Sep. 26, 1989

[54] METHOD AND APPARATUS FOR REPLACING SIDEWALL OF TIRE

[75] Inventors: Michael J. King, Concord; Robert A. Flynn, San Francisco; Henry Torrez, San Leandro, all of Calif.

[73] Assignee: Oliver Rubber Company, Oakland, Calif.

[21] Appl. No.: 233,859

[22] Filed: Aug. 17, 1988

Related U.S. Application Data

[63] Continuation of Ser. No. 14,460, Feb. 13, 1987, abandoned.

[51] Int. Cl.[4] .............................................. B29D 30/72
[52] U.S. Cl. ........................................ 156/96; 156/95; 156/909; 264/36; 264/326; 425/17
[58] Field of Search ............ 156/95, 96, 130.3, 130.7, 156/87, 116, 323, 394.1, 421.6, 909; 425/15-17, 19, 22, 20, 25, 28 R, 35, 54-56; 264/36, 326

[56] References Cited

U.S. PATENT DOCUMENTS

| | | | |
|---|---|---|---|
| 2,343,724 | 3/1944 | Wheatley | 156/96 |
| 2,779,386 | 1/1957 | Waters | 156/87 |
| 2,973,799 | 3/1961 | Kelly | 156/87 X |
| 3,232,816 | 2/1966 | Fields | 156/421.6 |
| 3,884,739 | 5/1975 | Hindin et al. | 156/96 |
| 3,895,985 | 7/1975 | Schelkmann | 156/96 |
| 3,935,045 | 1/1976 | Wolfe | 156/96 |
| 4,588,460 | 5/1986 | Magee et al. | 425/17 X |

FOREIGN PATENT DOCUMENTS

1118169  6/1968  United Kingdom .................. 425/22

Primary Examiner—Michael W. Ball
Assistant Examiner—Geoffrey L. Knable
Attorney, Agent, or Firm—Owen, Wickersham & Erickson

[57] ABSTRACT

A method and apparatus for installing sidewall replacement members on a used tire carcass by attaching sidewall members to the pre-buffed and cement coated sidewalls of the tire carcass, covering each sidewall member with a flexible sidewall mold, placing a flexible curing envelope around said tire carcass including the sidewall molds and sealing the envelope in the bead area of the tire carcass. The envelope covered tire carcass is then placed in a curing chamber at a preselected temperature and pressures for time period sufficient to cure said sidewall members and bond them on said tire carcass. The sidewall members can be installed in conjunction with the installation of tread rubber on the tire.

13 Claims, 4 Drawing Sheets

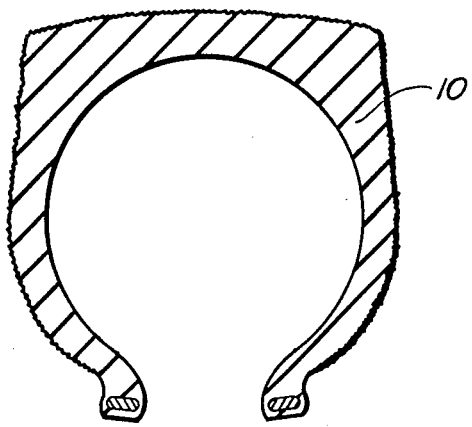
FIG._1.
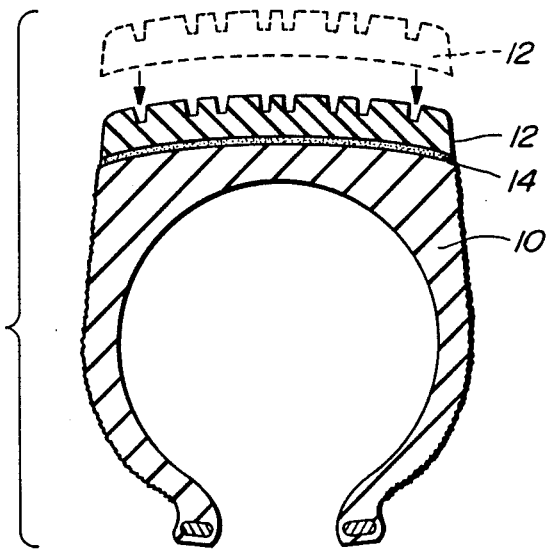
FIG._2.
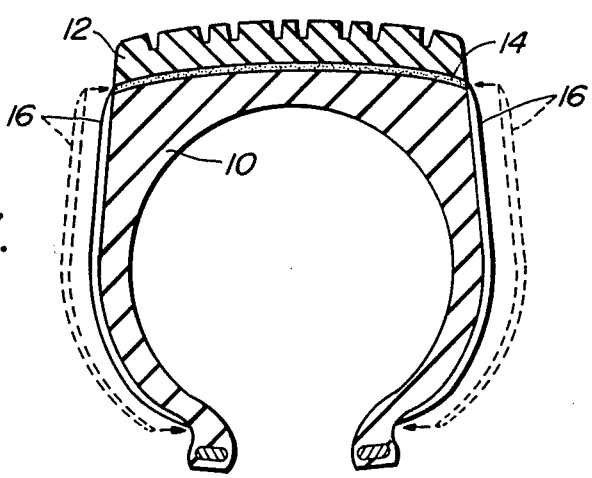
FIG._3.

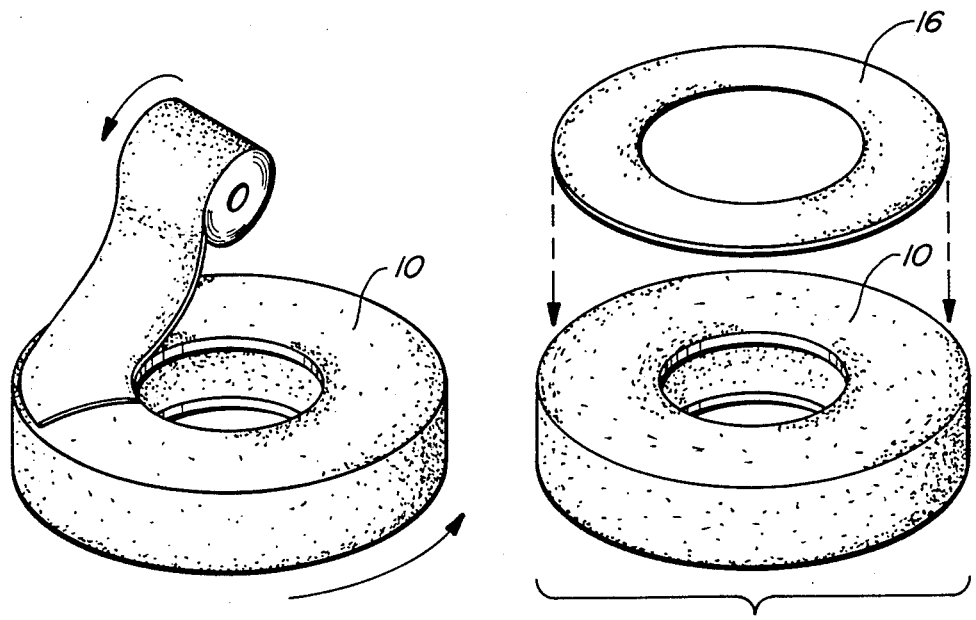
FIG._3A.  FIG._3B.
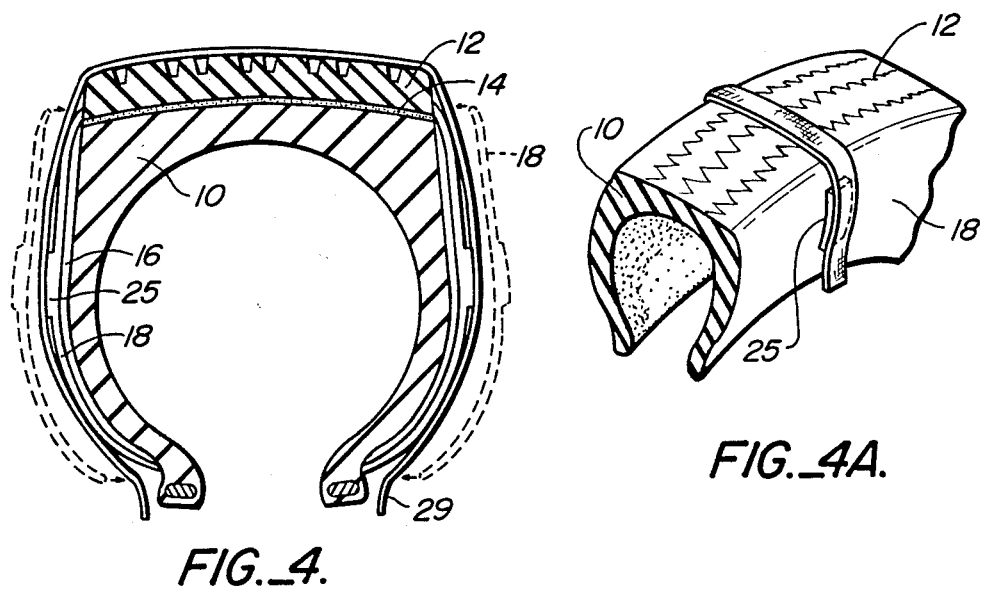
FIG._4.  FIG._4A.

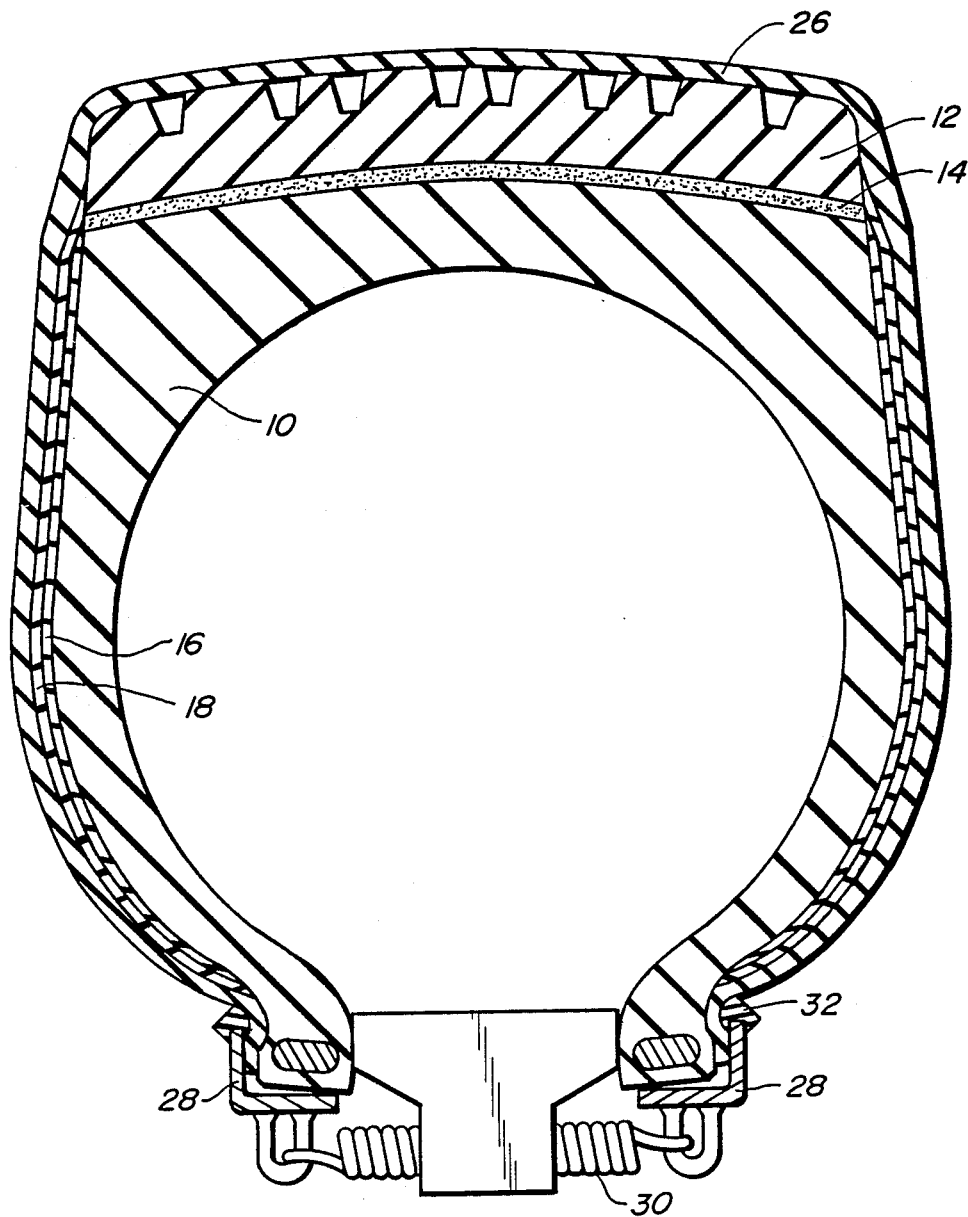
FIG._5.

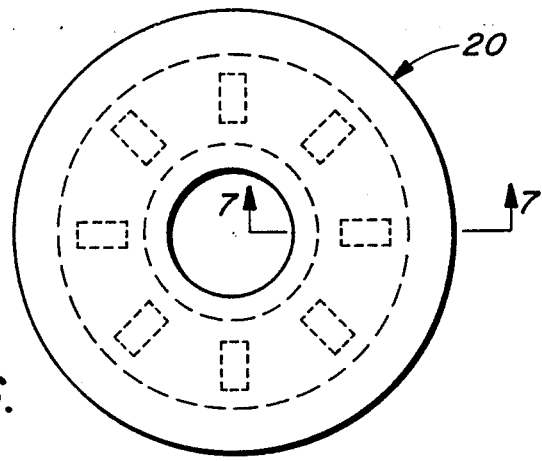
FIG._6.
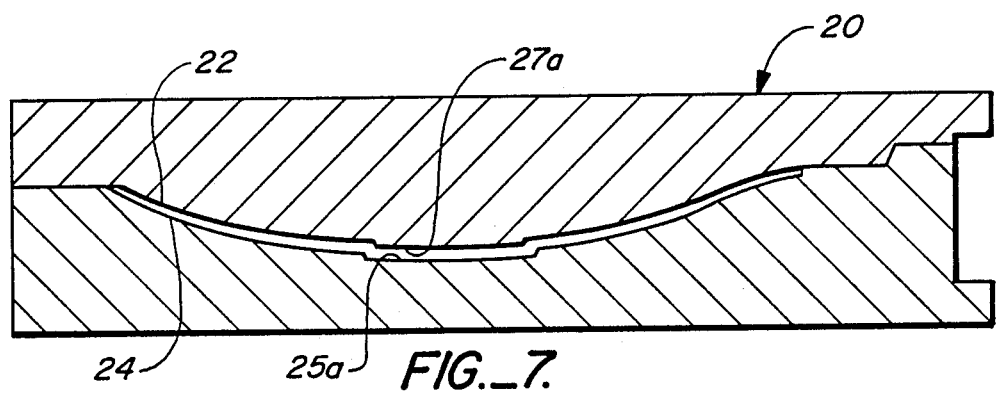
FIG._7.
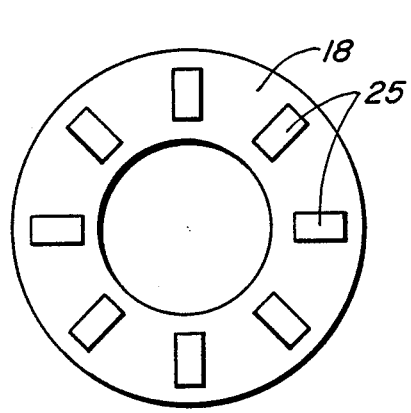
FIG._8.
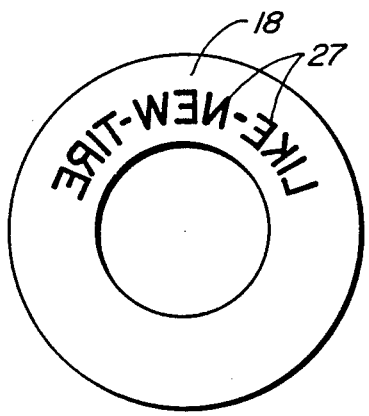
FIG._9.

METHOD AND APPARATUS FOR REPLACING SIDEWALL OF TIRE

This application is a continuation of application Ser. No. 014,460, filed Feb. 13, 1987, now abandoned.

This invention relates to the replacement of sidewalls on tires and more particularly to the use of a flexible curing envelope in lieu of a rigid mold for such sidewall replacement.

BACKGROUND OF THE INVENTION

During normal use of a tire, its sidewalls may suffer considerable wear, damage or general deterioration due to contact with roadway objects and curbs. Also, rubber inherently deteriorates due to oxidation or an ozone reaction that tends to produce cracks or checking in the sidewall surfaces. Over a period of time such cracks become worse, particularly when the tire is used in a moisture environment. To counteract such sidewall wear and degradation in tires it has been proposed to apply a new layer of rubber to the sidewall area. Heretofore, the addition or replacement of sidewall rubber to tires was accomplished by means of rigid molding apparatus using uncured rubber. Examples of such sidewall molding apparatus is found in U.S. Pat. Nos. 2,574,171, 3,232,816 and 3,492,180. In these devices, each molding apparatus must be carefully sized to conform to this particular tire being processed. In addition to the fact that such prior sidewall molding apparatus was highly expensive, it had the further disadvantage that the procedure for using it to prepare a tire and complete the molding process required considerable time and labor.

Summary of the Invention

It is a general object of the present invention to provide an improved method and apparatus for installing new sidewall layers to a tire without the use of rigid sidewall molding apparatus.

Another object of the invention is to provide a method for installing new sidewall members to a tire as it is simultaneously being recapped with precured tread rubber.

Yet another object of this invention is to provide an apparatus and a method for installing neW sidewall members to a tire which greatly increases its useful life as well as its cosmetic appearance.

Still another object of the invention is to provide a method and an apparatus for installing new sidewall members on a tire with relative speed and economy.

In accordance with the principles of the invention, a tire to be supplied with new sidewall replacements is first prepared for processing. Generally, this entails buffing the sidewall areas to remove a layer of surface material that may contain cracked, checked or oxidized rubber. Usually, the tire will also require retreading, and thus buffing of the tread area will also be accomplished. The sidewall replacement rubber is precut from suitable uncured sheet rubber material either in strip form or in two annular pieces having the proper dimensions to fit the tire being processed. These uncured rubber members are used in combination with annular shaped flexible molds preferably made from a relatively tough cured rubber. A thin layer of uncured bonding cement is applied to the prepared tire carcass to initially hold each sidewall replacement member on the tire. When the sidewall replacement members are both in place on the tire, they are covered by the flexible rubber molds and then by a flexible curing envelope which extends from bead to bead on the tire, over and around its tread area. If the tire is to be supplied with a new precured tread, such a tread strip with its bonding layer is also installed on the tire carcass before the curing envelope is installed. With the envelope in place, extending over the tread and sidewall areas, a suitable means is provided to seal the envelope in the bead areas of the tire.

Now, the entire tire assembly including the carcass and the attached sidewall replacements, the tread strip, the envelope and the sealing apparatus are placed in a suitable curing chamber or a so called rim and bag apparatus wherein temperature and pressure can be controlled for a predetermined period of time. During this time period, the sidewall replacement members (and the tread strip, if used) are attached permanently to the tire. The added sidewall members not only afford new protective side layers to the tire but they also provide a "like new" tire appearance, and they further make possible the use of additional cosmetic features such as distinctive color, design or written indicia for the tire sidewalls.

Other objects, advantages and features of the invention will become apparent from the following detailed description of embodiments thereof, taken in conjunction with the accompanying drawing.

BRIEF DESCRIPTION OF THE DRAWING

FIG. 1 is a fragmentary view in section of a tire carcass that has been buffed in preparation for installation of sidewall replacement members according to the invention.

FIG. 2 shows the tire carcass of FIG. 1 with tread rubber and a bonding layer in place.

FIG. 3 shows the tire carcass of FIG. 1 with tread rubber and sidewall members initially in place prior to curing.

FIG. 3A is a view in perspective showing one method for initially installing a sidewall member using uncured rubber in strip form.

FIG. 3B is an exploded view in perspective showing an alternative method of installing a sidewall member using an annular pre-cut uncured rubber sheet material.

FIG. 4 is a view similar to FIG. 3, with the addition of the rubber molds for the sidewall members in place.

FIG. 4A is a fragmentary view in perspective showing the placement of wicking strips over the sidewall rubber molds according to the invention.

FIG. 5 is an enlarged view in section showing the entire tire assembly with tread rubber, sidewall members and sidewall molds in place, covered by a sealing envelope and ready for placement in a curing chamber.

FIG. 6 is a plan view of a mold for making the sidewall molds shown in FIGS. 4 and 5.

FIG. 7 is an enlarged view in section taken along line 7—7 of FIG. 6.

FIG. 8 is a front plan view of a typical sidewall rubber mold according to the invention.

FIG. 9 is a rear plan view of the rubber sidewall mold of FIG. 8.

DETAILED DESCRIPTION OF EMBODIMENT

The present invention may be applied to any vehicle tire but is particularly adaptable for use on relatively large, inflatable truck tires of the well known radial construction. Such tires have casings of high strength and durability which enables them to be recapped when the tread rubber wears down. Recapping is most efficiently accomplished using precured tread rubber that is bonded to a prepared tire casing. A preferred and highly effective recapping process, is shown in U.S Pat. No. 4,624,732, which is assigned to the assignee of the present invention. Generally, in this recapping process a band of tread rubber is held in place around the prepared casing that covers a relatively thin intermediate layer of uncovered rubber on the casing. The entire tire assembly with the tread rubber in place is then covered with a curing envelope that is sealed by an appropriate means around its edges. The tire assembly is then placed in a closed chamber under controlled pressure and temperature conditions so that the tread rubber becomes bonded to the casing by the intermediate layer of rubber.

The present invention provides a method for bonding sidewall members to the tire casing using essentially the same apparatus and at the same time that the tread rubber recapping process takes place.

The first step of the present method according to the invention is to prepare a selected tire casing 10 for sidewall replacement as shown in FIG. 1. This can be done efficiently at the same time that the tire casing is prepared for normal recapping. Thus, as the tread area is buffed by suitable abrasive means, the sidewalls of the casing are also buffed preferably using rubber removal devices such as abrasive buffers of a suitable type. During this buffing step an outer layer of sidewall rubber that has possibly cracked due to weathering, oxidation or ozone exposure or has been scuffed or marred, is removed. The amount of sidewall rubber removed may vary from 0.030 to 0.080 inches, and generally the tire casing is fully buffed on its sidewall and tread areas to just above the rim area on each side.

After buffing, the freshly exposed rubber of the tire is treated, as by spraying, with a rubber cement to impart a building tack and a protective coating to the entire outer surface of the tire. A typical rubber cement that may be used is known generically as a solvent based rubber spray retread cement and is commercially available.

Utilizing the principles of the invention, new sidewall members can be installed without retreading the tire although in most cases the two operations can be accomplished simultaneously.

Assuming that the tire being processed is also to be recapped, a band of tread rubber 12 is next applied to the tire, as shown in FIG. 2, using the preliminary steps of the previously established recapping procedure. This involves the initial installation of an intermediate band of uncured rubber 14 which is placed around the tread area of the tire 10 and held in place by the previously applied tack of rubber cement. The pre-cured tread rubber 12 is then wrapped around the uncured band 14 and its ends are stapled or stitched together to hold it in place.

Now, as shown in FIG. 3, a pair of annular shaped sidewall members 16 are placed in position on the opposite sidewalls of the tire. These sidewall members are also initially held in place by the rubber cement previously applied to the buffed sidewall surfaces of the tire.

In one form the sidewall members 16A may be made from strips of uncured rubber material of equal width and a uniform thickness (e.g. 0.030 to 0.080 inches) as shown in FIG. 5. Here, each uncured rubber strip 16 is removal from a roll 17 of stock and applied to the prepared tire sidewall surface in the required annular configuration, with its outer edge extending at least to the outer edge of the buffed tire sidewall or just covering the edge of the bonding layer 14 for the tread rubber 12. The strip 16A is wide enough so that its other, inner edge extends into the bead area of the tire. As the strip material is first applied to the prepared tire it is smoothed to the tire surface by a suitable tool, such as hobbed roller, which flattens the uncured rubber material against the tires outer surface and eliminates any wrinkles in the strip, particularly near its inner edge.

As an alternative to the use of strip-sheet rubber material, the annular sidewall replacement members 16 may be die-cut to a preselected size from a sheet of uncured rubber material having a uniform thickness. These precut donut shaped members 16B are then placed on the buffed and cemented tire sidewall as shown in FIG. 3B. For some vehicles subject to extreme sidewall wear or damage the thickness of sidewall material may be made of thicker material, as much as 0.500 inches. The type of rubber preferred for these sidewall replacement members is generally referred to as new tire sidewall composition. It may be of any suitable color, and it preferably is selected to have oxidation and ozone resistant characteristics. Again, as shown in FIG. 4, each sidewall member 16, is sized so that its inner edge is close to the tire bead and its outer edge just meets or slightly overlaps the inner edge of the tread rubber strip. Whether the strips 16A or precut donuts 16B of uncured rubber are utilized for the sidewall members, either form thereof is preferably perforated with a multiplicity of small holes which allow air to escape from under the sidewall members as they are initially pressed and flattened against the tire sidewall surfaces.

With the annular sidewall members 16 held in place on the tire being processed, a pair of cured but flexible rubber molds 18 are provided. Each rubber mold is placed on one side of the tire against the uncured sidewall member.

As shown in FIGS. 6 and 7, the rubber molds are formed in a rigid two-piece, annular mold 20, preferably made of a metal such as aluminum and having spaced apart interior mold surfaces 22 and 24 that are slightly curved in cross-section to form a normal convex contour for various dimensioned tire sidewalls. This rigid mold may also be formed with raised portion 27A on its interior surface 22 having any pattern of design, lettering or indicia that is desired to be formed as indicia 27 on the inside surface of each rubber mold. Thus, one or both rubber molds 18 may be provided with any desired surface lettering, logo or pattern 27, as shown typically in FIG. 9.

On the opposite interior surface 24 of the mold 20, a series of recesses 25A are provided to form a like number (e.g. eight) of integral pads 25 on the outside surface of each rubber mold 18. Using a relatively flexible and tough rubber material formed in an annular shape, each rubber mold is cured within the rigid mold 20 to provide the finished cured rubber mold 18. As shown on FIG. 8. The eight integral pads 25 are formed at 45° spaced apart locations on the outside surface of each sidewall mold. These pads provide areas of increased rubber thickness in the rubber mold 18 to which strips of wicking material 29 can be conveniently stapled during the sidewall curing process.

Now, with the rubber molds 18 in place over the uncured sidewall members on each side of the tire 10, the entire assembly is ready for installation within a curing envelope 26, as shown in FIG. 5. Prior to installation within the curing envelope, four to eight strips of meshed wicking material 29 are perferably placed over the tread area from sidewall to sidewall on the tire, extending past each sidewall mold by a short distance (e.g. 0.25 inches) as illustrated in FIGS. 4 and 4A. As previously stated, each wicking strip 29 is stapled to an integral pad 25 on the rubber sidewall molds 18 to help keep them in place. The entire tire assembly, as shown in FIG. 5, is now covered by the curing envelope 26, from bead to bead. The envelope is pressed firmly against the tread and sidewall outer surfaces so that no air is trapped under the envelope The wicking strips 29 serve to help air escape from under the envelope along with rubber perforation. Following its installation on the tire assembly, the envelope is sealed by an appropriate mechanism such as a pair of ring members 28 that are drawn together by a series of connecting springs 30 so that sealing members 32 can press the envelope against the tire carcass near the beads and seal it. Details of such a mechanism are shown in the aforesaid U.S Pat. No. 4,624,732, but other forms of curing apparatus could be used. Now, the entire assembly is placed into a curing chamber (not shown) where the assembly is subjected to heat and pressure sufficient to cure the bonding layer for the tread rubber as well as the sidewall members 16. As shown in FIG. 5, the sidewall molds 18 are held in place solely by the envelope 26. To adequately cure the sidewall members 16, the entire assembly should be retained in a curing chamber for approximately 30-300 minutes at a temperature of around 200-320° F. and at a pressure of around 80 p.s.i. These parameters will vary in accordance with the type of curing equipment used and, to some extent, the size of the tire being processed.

As previously mentioned, in this assembly the outer edge of each sidewall member 16 extends outwardly to the bottom edge of the tread rubber. Thus, when the recapping—residewalling curing cycle takes place, sidewall rubber will flow slightly under its mold, and the interface between the tread rubber and the tire carcass will become covered by the sidewall members, so that it cannot be seen. This greatly enhances the cosmetic effect on the re-sidewalled tire. The sidewall members during the curing cycle, which are under pressure from the rubber molds 18, tend to form tapered or feathered inner and outer edges with the tire carcass. Therefore, the finished recapped and residewalled tire has a smooth "like new" appearance as well as being strong, durable and capable of further extensive use. Although in the embodiments described, the uncured sidewall members 16 have generally a uniform thickness, this thickness need not be uniform and could exceed 0.080 inches if one wanted to reinforce and protect the tire sidewalls from damage in subsequent usage.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A method for installing sidewall replacement members on a used tire carcass comprising the steps of:
    removing an outer layer of old rubber from the sidewall areas of the tire carcass to expose roughened sidewall surfaces of fresh rubber thereon;
    applying a coating of rubber cement to said roughened sidewall surfaces;
    providing a coating of rubber cement to said roughened sidewall surfaces;
    providing a pair of sidewall replacement members of uncured rubber and attaching them to the roughened, cement coated sidewall surfaces of said tire carcass;
    providing a pair of flexible sidewall molds formed from precured rubber in an annular shape and with a convex curvature in cross-section to conform generally with the sidewall surface of the tire, each extending over and adjacent to a said sidewall member on said tire carcass;
    holding said sidewall molds in place solely with a flexible curing envelope placed around said tire carcass including said molds and said sidewall members, said envelope being sealed in the bead area of said tire carcass; and
    placing the envelope covered tire carcass in a curing chamber at a preselected temperature and pressure for a time period sufficient to cure said sidewall members and bond them to said tire carcass.

2. The method as described in claim 1 including the further steps of:
    removing old rubber from the tread area of the tire carcass and buffing the tread area to a uniform, roughened surface;
    applying a layer of uncured bonding rubber to the tread area before the sidewall members are attached; and
    installing a precured strip of tread rubber around the tire carcass over said layer of bonding rubber before said envelope is placed around the tire carcass.

3. The method as described in claim 1 wherein said sidewall replacement members are perforated with a multiplicity of small holes.

4. The method as described in claim 1 wherein said sidewall replacement members are cut from a strip of uncured rubber having a uniform width and thickness.

5. The method as described in claim 1 wherein said sidewall replacement members are precut in an annular shape with predetermined dimensions before being attached to said tire carcass.

6. The method as described in claim 1 wherein said sidewall replacement members are cut from a sheet of uncured rubber having a uniform thickness in the range of 0.030 to 0.150 inches.

7. The method as described in claim 1 including the step of placing strips of wicking material between the sidewall molds and the envelope before the envelope covered tire carcass is placed in a curing chamber.

8. The method as described in claim 7 wherein said strips of wicking material are placed at circumferentially spaced apart locations on the tire carcass, each said wicking strip extending from bead to bead on the tire carcass and attached to the outer surface of said sidewall molds on opposite sides of the tire.

9. A method for installing sidewall replacement members and tread rubber on a used tire carcass comprising the steps of:
    removing an outer layer of old rubber from the tread area and sidewall areas of the tire carcass to expose roughened tread area and sidewall surfaces of fresh rubber thereon;
    applying a coating of rubber cement to said roughened tread area and sidewall surfaces;

applying a layer of uncured bonding rubber to the tread area;

installing a precured strip of tread rubber around the tire carcass over said layer of bonding rubber and connecting the ends of said precured strip;

providing a pair of perforated preformed sidewall replacement members of uncured rubber and attaching them to the roughened, cement coated sidewall of said tire carcass;

providing a pair of flexible sidewall molds formed from precured rubber in an annular shape and with a convex curvature in cross-section to conform generally with the sidewall surface of the tire, each extending over and adjacent to a said sidewall member on said tire carcass;

holding said molds in place solely with a flexible curing envelope placed around said tire carcass including said molds and said sidewall members, said envelope being sealed in the bead area of said tire carcass; and placing the envelope covered tire carcass in a curing chamber at a preselected temperature and pressures for a time period sufficient to cure said sidewall members and bond them on said tire carcass.

10. The method as described in claim 9 wherein said sidewall members are positioned on said tire carcass so that their radially outer peripheral edges extend to at least the interface of said tread rubber and uncured bonding rubber, whereby the bonding material for said tread rubber is not visible in the finished tire.

11. The method as described in claim 9 wherein said sidewall replacement members are formed from a sheet of uncured rubber material having a uniform thickness.

12. The method as described in claim 9 wherein said sidewall molds extend beyond the radially inner and outer edges of said sidewall replacement members which become feathered during the curing process.

13. The method as described in claim 12 wherein said sidewall molds are provided with preformed surface irregularities for forming predetermined lettering or indicia in the outer surfaces of said sidewall replacement members during the curing process.

* * * * *

UNITED STATES PATENT AND TRADEMARK OFFICE
CERTIFICATE OF CORRECTION

PATENT NO. : 4,869,759

DATED : September 26, 1989

INVENTOR(S) : King et al

It is certified that error appears in the above-identified patent and that said Letters Patent is hereby corrected as shown below:

Column 3, line 9, "uncovered" should read --uncured--.
Column 3, line 66, "FIG. 5" should read --Fig. 3--.
Column 6, lines 3 and 4, "providing a coating of rubber cement to said rough-ened sidewall surfaces;" should be deleted.

Signed and Sealed this

Fourteenth Day of January, 1992

Attest:

HARRY F. MANBECK, JR.

*Attesting Officer*  *Commissioner of Patents and Trademarks*